US012515463B2

(12) United States Patent
Kodaira

(10) Patent No.: US 12,515,463 B2
(45) Date of Patent: Jan. 6, 2026

(54) POST-PROCESSING APPARATUS

(71) Applicant: SEIKO EPSON CORPORATION, Tokyo (JP)

(72) Inventor: Hirohisa Kodaira, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 17/810,007

(22) Filed: Jun. 30, 2022

(65) Prior Publication Data

US 2023/0001714 A1 Jan. 5, 2023

(30) Foreign Application Priority Data

Jul. 5, 2021 (JP) ................................ 2021-111629

(51) Int. Cl.

*B65H 31/02* (2006.01)
*B41J 11/42* (2006.01)
*B65H 31/20* (2006.01)
*B65H 31/34* (2006.01)
(Continued)

(52) U.S. Cl.

CPC .............. *B41J 11/42* (2013.01); *B65H 31/02* (2013.01); *B65H 31/20* (2013.01); *B65H 31/34* (2013.01); *B65H 31/36* (2013.01); *B65H 31/38* (2013.01); *B65H 2301/4212* (2013.01); *B65H 2301/4213* (2013.01); *B65H 2404/1114* (2013.01); *B65H 2405/11151* (2013.01); *B65H 2511/24* (2013.01); *B65H 2513/10* (2013.01); *B65H 2515/12* (2013.01); *B65H 2601/272* (2013.01); *B65H 2801/27* (2013.01)

(58) Field of Classification Search

CPC .......... B41J 11/42; B65H 31/20; B65H 31/34; B65H 2601/272; B65H 2404/1114; B65H 2511/24; B65H 2513/10; B65H 2515/12; B65H 31/02; B65H 31/36; B65H 2301/4212; B65H 2301/4213; B65H 2405/11151; B65H 2801/27; B65H 31/38

See application file for complete search history.

(56) References Cited

U.S. PATENT DOCUMENTS

2017/0152118 A1* 6/2017 Kubota .............. B65H 31/3027
2018/0312363 A1* 11/2018 Noso ...................... B65H 37/04

FOREIGN PATENT DOCUMENTS

JP H09-255216 9/1997
JP 2003104579 A * 4/2003 .............. B65H 3/52
JP 2018-188237 11/2018

* cited by examiner

*Primary Examiner* — Yaovi M Ameh
(74) *Attorney, Agent, or Firm* — WORKMAN NYDEGGER

(57) ABSTRACT

A post-processing apparatus includes a side edge alignment section configured to move to a first position, a second position, that is farther from the side edges in the width direction than the first position, and a third position, that is between the first position and the second position in the width direction. The post-processing apparatus is configured to execute an adjustment operation of moving the side edge alignment section from the second position to the third position and an alignment operation of aligning the medium by causing the side edge alignment section to abut on the medium in the first position. The adjustment operation is executed while the first transport section transports the medium and the alignment operation is executed after the adjustment operation is performed and after the medium reaches a tip end alignment section.

11 Claims, 10 Drawing Sheets

(51) Int. Cl.
*B65H 31/36* (2006.01)
*B65H 31/38* (2006.01)

POST-PROCESSING APPARATUS

The present application is based on, and claims priority from JP Application Serial Number 2021-111629, filed Jul. 5, 2021, the disclosure of which is hereby incorporated by reference herein in its entirety.

BACKGROUND

1. Technical Field

The present disclosure relates to a post-processing apparatus that performs post-processing on a medium on which recording is performed by ejected liquid.

2. Related Art

In general, various post-processing apparatuses performing post-processing on a medium on which recording is performed by ejected liquid have been used. Such a post-processing apparatus sequentially transports a plurality of media subjected to recording by ejected liquid, aligns tip ends of the individual media, and performs post-processing, such as a stapling process, on the media having aligned tip ends, for example. In general post-processing apparatuses, a medium being transported may skew. Therefore, JP-A-2018-188237, for example, discloses a post-processing apparatus having a width adjustment cursor capable of narrowing a transport path for media in a width direction intersecting with a medium transport direction by sandwiching the media in the width direction so as to suppress skew of the media.

However, even when the post-processing apparatus has a component that narrows a transport path for media in the width direction, such as the width adjustment cursor of the post-processing apparatus according to JP-A-2018-188237, the skew of a medium in the post-processing apparatus may not be appropriately suppressed. Specifically, depending on a timing of a movement of the component, an amount of movement, or a movement method, a corner of a skewed medium being transported is damaged since the corner hits the component or a medium is not properly adjusted since the corner slips into a lower side of stacked media, for example.

SUMMARY

According to an aspect of the present disclosure, a post-processing apparatus that performs post-processing on a medium recorded by a recording section includes a stacking section that stacks the medium to be subjected to the post-processing, a first transport section that is brought into contact with the medium and applies transport force to the medium so as to transport the medium in a transport direction, a tip end alignment section that aligns a tip end of the medium in a downstream of the transport direction, the medium being stacked on the stacking section, a side edge alignment section that is configured to move in a width direction orthogonal to the transport direction of the medium and that aligns the medium by abutting on side edges of the medium from opposite sides in the width direction, and a controller that controls a position of the side edge alignment section. The side edge alignment section is configured to move to a first position where the side edge alignment section abuts on the side edges from the opposite sides in the width direction, a second position, that is farther from the side edges in the width direction than the first position, where the medium is stacked on the stacking section, and a third position, that is between the first position and the second position in the width direction, where the side edge alignment section is in contact with the medium when the first transport section transports the medium in a skewed manner. The controller is configured to execute an adjustment operation of moving the side edge alignment section from the second position to the third position and an alignment operation of aligning the medium by causing the side edge alignment section to abut on the medium in the first position. The adjustment operation is executed while the first transport section transports the medium and the alignment operation is executed after the adjustment operation is performed and after the medium reaches the tip end alignment section.

DESCRIPTION OF EXEMPLARY EMBODIMENTS

Figure 1:
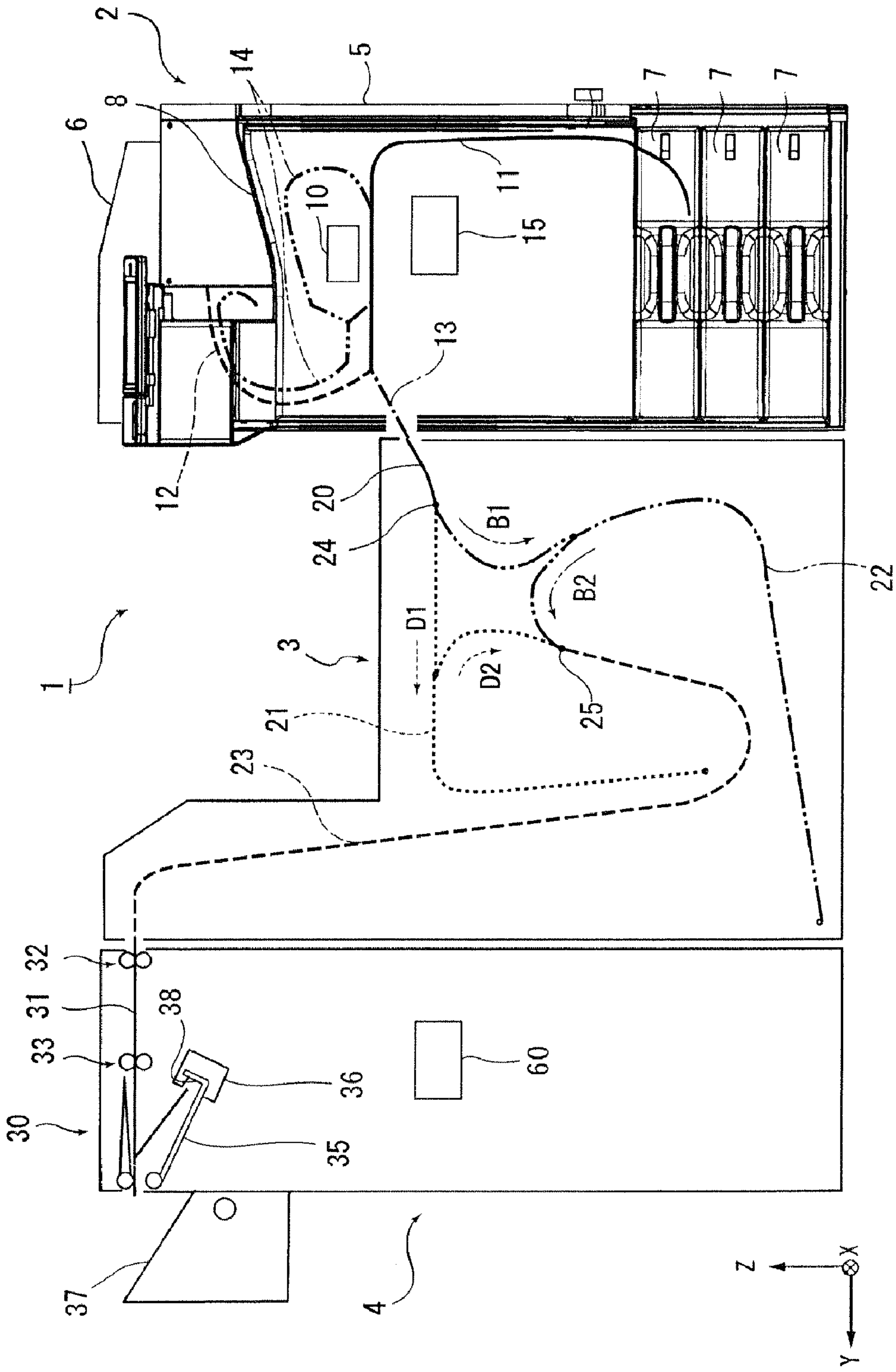
FIG. 1 is a diagram schematically illustrating a recording system according to an embodiment of the present disclosure.

Hereinafter, the present disclosure will be schematically described.

A post-processing apparatus according to a first aspect performs post-processing on a medium recorded by a recording section. The post-processing apparatus includes a stacking section that stacks the medium to be subjected to the post-processing, a first transport section that is brought into contact with the medium and applies transport force to the medium so as to transport the medium in a transport direction, a tip end alignment section that aligns a tip end of the medium in a downstream of the transport direction, the medium being stacked on the stacking section, a side edge alignment section that is configured to move in a width direction orthogonal to the transport direction of the medium and that aligns the medium by abutting on side edges of the medium from opposite sides in the width direction, and a controller that controls a position of the side edge alignment section. The side edge alignment section is configured to move to a first position where the side edge alignment section abuts on the side edges from the opposite sides in the width direction, a second position, that is farther from the side edges in the width direction than the first position, where the medium is stacked on the stacking section, and a third position, that is between the first position and the second position in the width direction, where the side edge alignment section is in contact with the medium when the first transport section transports the medium in a skewed manner. The controller is configured to execute an adjustment operation of moving the side edge alignment section from the second position to the third position and an alignment operation of aligning the medium by causing the side edge alignment section to abut on the medium in the first position. The adjustment operation is executed while the first transport section transports the medium and the alignment operation is executed after the adjustment operation is performed and after the medium reaches the tip end alignment section.

According to this aspect in addition to the alignment operation performed after the tip end of the medium reaches the tip end alignment section, the adjustment operation of moving the side edge alignment section from the second position to the third position is executed before the alignment operation while the medium is transported. Specifically, the process of suppressing skew of the medium is performed in a step-by-step manner. In this way, since the operation of suppressing skew of the medium is executed in a step-by-step manner, it is less likely that the corners of the medium transported in a skewed manner are damaged due to contact between the corners and the side edge alignment section and that the medium is not appropriately aligned since the corners slip into a lower side of the stacked media. Accordingly, the skew of the medium may be effectively reduced in the post-processing apparatus.

According to a second aspect, in the post-processing apparatus of the first aspect, the side edge alignment section extends in the transport direction, and the controller executes the adjustment operation after the tip end passes, in the entire width direction, side edges of the side edge alignment section in a downstream of the transport direction.

According to this aspect, since the side edge alignment section extends in the transport direction, the skew suppressing operation can be effectively executed for a long distance. Furthermore, the adjustment operation is executed after the tip end passes the downstream edge sections of the side edge alignment section in the transport direction in the entire width direction. Specifically, since the adjustment operation is executed after the corners of the tip end of the medium pass the side edge alignment section, crash of the corners of the tip end of the medium against the side edge alignment section can be suppressed and damage of the corners can be reduced.

According to a third aspect, in the post-processing apparatus of the first or second aspect, the side edge alignment section is configured to move to a fourth position between the second position and the third position in the width direction, and the controller moves the side edge alignment section to the fourth position after the alignment operation so as to execute the alignment operation again.

According to this aspect, since the alignment operation is performed again after the alignment operation is executed, skew of the medium in the post-processing apparatus may be effectively suppressed. Furthermore, since an amount of movement of the side edge alignment section in the width direction at the time of the alignment operation executed again is larger than that at the time of the preceding alignment operation, in particular, skew of the medium in the post-processing apparatus can be effectively suppressed.

According to a fourth aspect, the post-processing apparatus of any one of the first to third aspects further includes a second transport section that is disposed in a downstream of the first transport section in the transport direction and that is brought into contact with the medium and applies transport force to the medium so as to transport the medium in the transport direction. The controller executes the adjustment operation before the medium is brought into contact with the second transport section.

According to this aspect, the adjustment operation is executed before the medium is brought into contact with the second transport section. When the adjustment operation is executed in a state in which the medium is in contact with the second transport section, the adjustment operation may not be appropriately performed due to friction force between the medium and the second transport section or the like. However, such possibility may be reduced.

According to a fifth aspect, the post-processing apparatus of any one of the first to third aspects further includes a second transport section that is disposed in a downstream of the first transport section in the transport direction and that is brought into contact with the medium and applies transport force to the medium so as to transport the medium in the transport direction. The second transport section is located in a position facing the medium and is moved between a contact position where the second transport section is in contact with the medium and a separation position where the second transport section is separated from the medium, and the controller executes the adjustment operation when the second transport section is in the separation position.

According to this aspect, the adjustment operation is executed when the second transport section is in the separation position. When the adjustment operation is executed in a state in which the medium is in contact with the second transport section, the adjustment operation may not be appropriately performed due to friction force between the medium and the second transport section or the like. However, such possibility may be reduced.

According to a sixth aspect, in the post-processing apparatus of any one of the first to fifth aspects, the first transport section is located in a position facing the medium and is moved between a contact position where the first transport section is in contact with the medium and a separation position where the first transport section is separated from the medium, and the controller executes the adjustment operation when the first transport section is in the separation position.

According to this aspect, the adjustment operation is executed when the first transport section is in the separation position. When the adjustment operation is executed in a state in which the medium is in contact with the first transport section, the adjustment operation may not be appropriately performed due to friction force between the medium and the first transport section or the like. However, such possibility may be reduced.

According to a seventh aspect, the post-processing apparatus of any one of the first to sixth aspects further includes an estimation section that estimates an amount of skew of the medium. When the amount of skew estimated by the estimation section is not larger than a first threshold value, the controller executes the alignment operation without executing the adjustment operation.

According to this aspect, when the skew amount estimated by the estimation section is not larger than the first threshold value, the alignment operation is executed without executing the adjustment operation. When the skew amount is small, the alignment operation may be effectively performed without executing the adjustment operation, and therefore, control performed when the alignment operation is effectively performed but the adjustment operation is not executed can be simplified.

According to an eighth aspect, in the post-processing apparatus disclosed in the seventh aspect, the recording section performs recording on the medium by ejecting liquid, the estimation section estimates the amount of skew using an ejection rate of the liquid per unit area of the medium, one of regions divided by a center of the medium in the width direction is determined as a first region, the other of the regions is determined as a second region, the ejection rate in the first region is determined as a first ejection rate, and the ejection rate in the second region is determined as a second ejection rate, and the controller executes the adjustment operation when a difference rate that is a difference between the first ejection rate and the second ejection rate is not less than a second threshold value.

According to this aspect, the adjustment operation is executed when the difference rate is equal to or larger than the second threshold value. As the difference rate becomes large, a difference between a friction coefficient of the medium and the first transport section in the first region and a friction coefficient of the medium and the second transport section in the second region becomes large, and therefore, skew is likely to occur. However, since the adjustment operation is executed in such a case, the skew of the medium in the post-processing apparatus may be effectively suppressed.

According to a ninth aspect, in the post-processing apparatus of any one of the first to sixth aspects, the controller executes the alignment operation after executing the adjustment operation when a stacked medium exists under the medium being transported by the first transport section, and executes the alignment operation without executing the adjustment operation when the stacked medium does not exist under the medium being transported by the first transport section.

According to this aspect, the alignment operation is executed after the adjustment operation is executed when a stacked medium exists under the medium being transported by the first transport section, and the alignment operation is executed without executing the adjustment operation when the stacked medium does not exist under the medium being transported by the first transport section. When a stacked medium exists, skew is likely to occur when compared with a case where a stacked medium does not exist. However, when the adjustment operation is executed when a stacked medium exists, skew of the medium in the post-processing apparatus may be effectively reduced.

According to a tenth aspect, the post-processing apparatus of any one of the first to ninth aspects further includes a low-friction member in such a position, in a transport region of the medium transported by the first transport section, that the low-friction member is in contact with a lower surface of the medium.

According to this aspect, a low-friction member is provided in such a position, in a transport region of the medium transported by the first transport section, that the low-friction member is in contact with a lower surface of the medium. Therefore, the medium is easily moved in the transport region of the medium, and accordingly, the transport direction of the medium may be effectively corrected and the skew of the medium may be effectively suppressed.

According to an eleventh aspect, in the post-processing apparatus of any one of the first to tenth aspects, the controller realizes a lower movement speed of the side edge alignment section at a time of the alignment operation than a movement speed of the side edge alignment section at the time of the adjustment operation.

According to this aspect a lower movement speed of the side edge alignment section at the time of the alignment operation than a movement speed of the side edge alignment section at the time of the adjustment operation is realized. Specifically, the adjustment operation that requires lower accuracy is executed at high speed, and therefore, reduction of a transport speed of the medium is not required and degradation of throughput is suppressed, whereas the alignment operation that requires high accuracy is reliably executed at low speed, and therefore, the skew of the medium is effectively suppressed.

Hereinafter, an embodiment will be described with reference to the accompanying drawings. In an X-Y-Z coordinate system in each of the drawings, an X axis extends in a horizontal direction and indicates a width direction, a Y axis extends in the horizontal direction and indicates a direction orthogonal to the X axis, and a Z axis indicates a vertical direction.

Outline of Recording System

A recording system 1 of FIG. 1 includes a recording unit 2, an intermediate unit 3, and a processing unit 4 serving as a post-processing apparatus that are arranged in this order from right to left in FIG. 1, for example. The recording unit 2 includes a line head 10 serving as a recording section that performs recording on a medium P. The intermediate unit 3 receives the recorded medium P from the recording unit 2 and supplies the medium P to the processing unit 4. The processing unit 4 includes a medium transport apparatus 30 that transports the medium P subjected to recording performed by the recording unit 2 and a processing section 36 that executes a predetermined process on the medium P stacked on a stacking section 35 in the medium transport apparatus 30. In the recording system 1, the recording unit 2, the intermediate unit 3, and the processing unit 4 are coupled to one another and may transport the medium P from the recording unit 2 to the processing unit 4.

The recording system 1 is configured such that a recording operation on the medium P or the like in the recording unit 2, the intermediate unit 3, and the processing unit 4 may be input using an operation panel, not illustrated. The operation panel may be disposed in the recording unit 2, for example. Hereinafter, configurations of the recording unit 2, the intermediate unit 3, and the processing unit 4 will be schematically described in this order.

Recording Unit

The recording unit 2 illustrated in FIG. 1 is configured as a multifunction peripheral including a printer section 5 having the line head 10 performing recording by ejecting ink, that is, liquid, to the medium P and a scanner section 6. In this embodiment, the printer section 5 is configured as a so-called ink jet printer performing recording by ejecting ink, that is, liquid, to the medium P from the line head 10.

A plurality of medium accommodation cassettes 7 are provided in a lower portion in the recording unit 2. The medium P accommodated in one of the medium accommodation cassettes 7 is supplied through a supply path 11 indicated by a solid line in the recording unit 2 illustrated in FIG. 1 to a recording region of the line head 10 so that a recording operation is performed. The medium P that has been subjected to the recording by the line head 10 is supplied to a first discharge path 12 for discharging the medium P to a post-recording discharge tray 8 disposed over the line head 10 or a second discharge path 13 for supplying the medium P to the intermediate unit 3. In the recording unit 2 of FIG. 1, the first discharge path 12 is indicated by a dotted line, and the second discharge path 13 is indicated by a dashed-dotted line.

Furthermore, the recording unit 2 includes an inversion path 14 indicated by a dashed-two dotted line in the recording unit 2 illustrated in FIG. 1 and is capable of performing recording on a first surface of the medium P and then recording on a second surface of the medium P after inverting the medium P, that is, double-sided recording. Note that, in each of the supply path 11, the first discharge path 12, the second discharge path 13, and the inversion path 14, at least one pair of transport rollers, not illustrated, is disposed as an example of a device for transporting the medium P. The recording unit 2 includes a controller 15 that controls operation associated with transport and recording of the medium P in the recording unit 2.

Intermediate Unit

The intermediate unit 3 illustrated in FIG. 1 is installed between the recording unit 2 and the processing unit 4 and receives the recorded medium P supplied from the second discharge path 13 of the recording unit 2 by a receiving path 20 so as to transport the medium P to the processing unit 4. The receiving path 20 is indicated by a solid line in the intermediate unit 3 of FIG. 1.

The intermediate unit 3 has two transport paths for transporting the medium P. A first transport path is for transport from the receiving path 20 through a first switchback path 21 to a discharge path 23. A second transport path is for transport from the receiving path 20 through a second switchback path 22 to the discharge path 23. After being supplied to the first switchback path 21 in a direction indicated by an arrow mark D1, the medium P is switched back in a direction indicated by an arrow mark D2. After being supplied to the second switchback path 22 in a direction indicated by an arrow mark B1, the medium P is switched back in a direction indicated by an arrow mark B2.

The receiving path 20 is branched into the first switchback path 21 and the second switchback path 22 in a branching portion 24. Furthermore, the first and second switchback paths 21 and 22 join together in a joint portion 25. Accordingly, even when the medium P is supplied from the receiving path 20 to any one of the switchback paths, the medium P can be supplied from the common discharge path 23 to the processing unit 4. Each of the receiving path 20, the first switchback path 21, the second switchback path 22, and the discharge path 23 has at least one pair of transport rollers not illustrated.

When the recording unit 2 successively performs recording on a plurality of media P, the media P supplied to the intermediate unit 3 are alternately supplied to the transport path through the first switchback path 21 and the transport path through the second switchback path 22. By this, throughput of medium transport in the intermediate unit 3 can be enhanced. Note that the intermediate unit 3 may be omitted in the recording system 1. Specifically, the recording unit 2 may be coupled to the processing unit 4 so that the medium P obtained after recording performed by the recording unit 2 is directly supplied to the processing unit 4 without using the intermediate unit 3. As described in this embodiment, when the medium P obtained after recording performed by the recording unit 2 is supplied to the processing unit 4 through the intermediate unit 3, a period of time required for the transport is longer than a case where the medium P is directly supplied from the recording unit 2 to the processing unit 4, and therefore, ink on the medium P may be well dried before the medium P is transported to the processing unit 4.

Processing Unit

The processing unit 4 illustrated in FIG. 1 includes a controller 60, a medium transport apparatus 30, and a processing section 36 and is configured such that the processing section 36 performs post-processing on a transported medium P in the medium transport apparatus 30 under control of the controller 60. Examples of the post-processing performed by the processing section 36 include a stapling process and a punching process. The medium P is supplied from the discharge path 23 of the intermediate unit 3 to a transport path 31 of the processing unit 4 and further transported by the medium transport apparatus 30. A transport roller pair 32 for transporting the medium P is disposed on an upstream in the transport direction of the transport path 31. Furthermore, a discharge roller pair 33 for discharging the medium P to the stacking section 35 is disposed on a downstream in the transport direction.

Hereinafter, the processing unit 4 will be described further in detail with reference to FIGS. 2 to 4. The processing unit 4 illustrated in FIG. 2 includes the discharge roller pair 33 that discharges the medium P referred to as a medium P2 in FIG. 2 in a discharge direction A1. Then the medium P discharged from the discharge roller pair 33 is stacked on the stacking section 35 as indicated as the medium P1 in FIG. 2. The medium P stacked on the stacking section 35 is transported in a transport direction A2 by upstream paddles 40 and downstream paddles 44 that serve as a first transport section described below, and a downstream tip end E1 in the transport direction A2 abuts on a tip end alignment section 38.

At this time, the medium P may skew during the transport. The skew occurs when an inclination caused at a time of discharge by the discharge roller pair 33 is not corrected or when transport is performed by the upstream paddle 40 and the downstream paddle 44. The skew caused by the transport by the upstream paddles 40 and the downstream paddles 44 is significant when recording is performed on the medium P by an ink jet printer. This is particularly significant when an ink jet printer is employed. When an ink jet printer is employed, a friction coefficient on a surface is increased since the medium P absorbs ink. Therefore, friction between the medium P and stacked media Ps or friction between the medium P and the stacking section 35 varies depending on a recording pattern of the medium P, and therefore, a load at a time of transport varies. Furthermore, since friction coefficients between the medium P and the upstream paddles 40 and the downstream paddles 44 also vary, when the plurality of upstream paddles 40 and the plurality of downstream paddles 44 are disposed in the width direction, an inclination may occur.

Guide members 41 that are in contact with the medium P discharged by the discharge roller pair 33 and that guides the medium P to the stacking section 35 are disposed over the stacking section 35. Each of the guide members 41 is capable of changing its position between a retracting position where discharge of the medium P by the discharge roller pair 33 is not disturbed as illustrated in FIG. 2 and an advancing position where the guide member 41 advances in a direction that becomes closer to the stacking section 35 relative to the retracting position as illustrated in FIG. 3. In FIG. 3, one of the guide members 41 in the retracting position is indicated by a dotted line. The guide members 41 are located in the retracting position illustrated in FIG. 2 when the medium P is transported by the discharge roller pair 33 in the discharge direction A1 and changes a location to the advancing position indicated by the solid line in FIG. 3 from the retracting position illustrated in FIG. 2 and indicated by a dotted line in FIG. 3 when the medium P discharged by the discharge roller pair 33 is guided to the stacking section 35.

Figure 2:
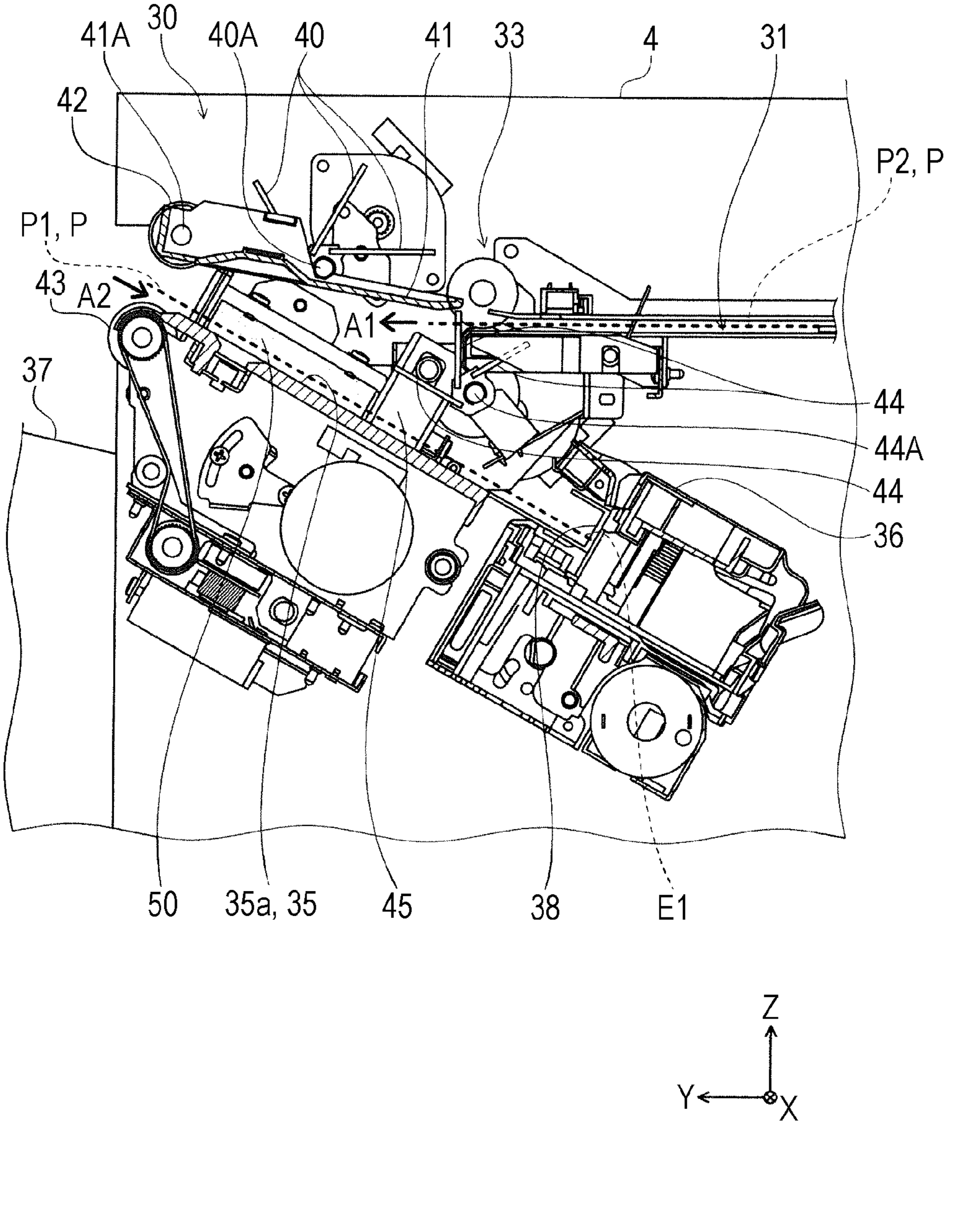
FIG. 2 is a cross-sectional view of a processing unit serving as a post-processing apparatus according to the embodiment of the present disclosure.
Figure 3:
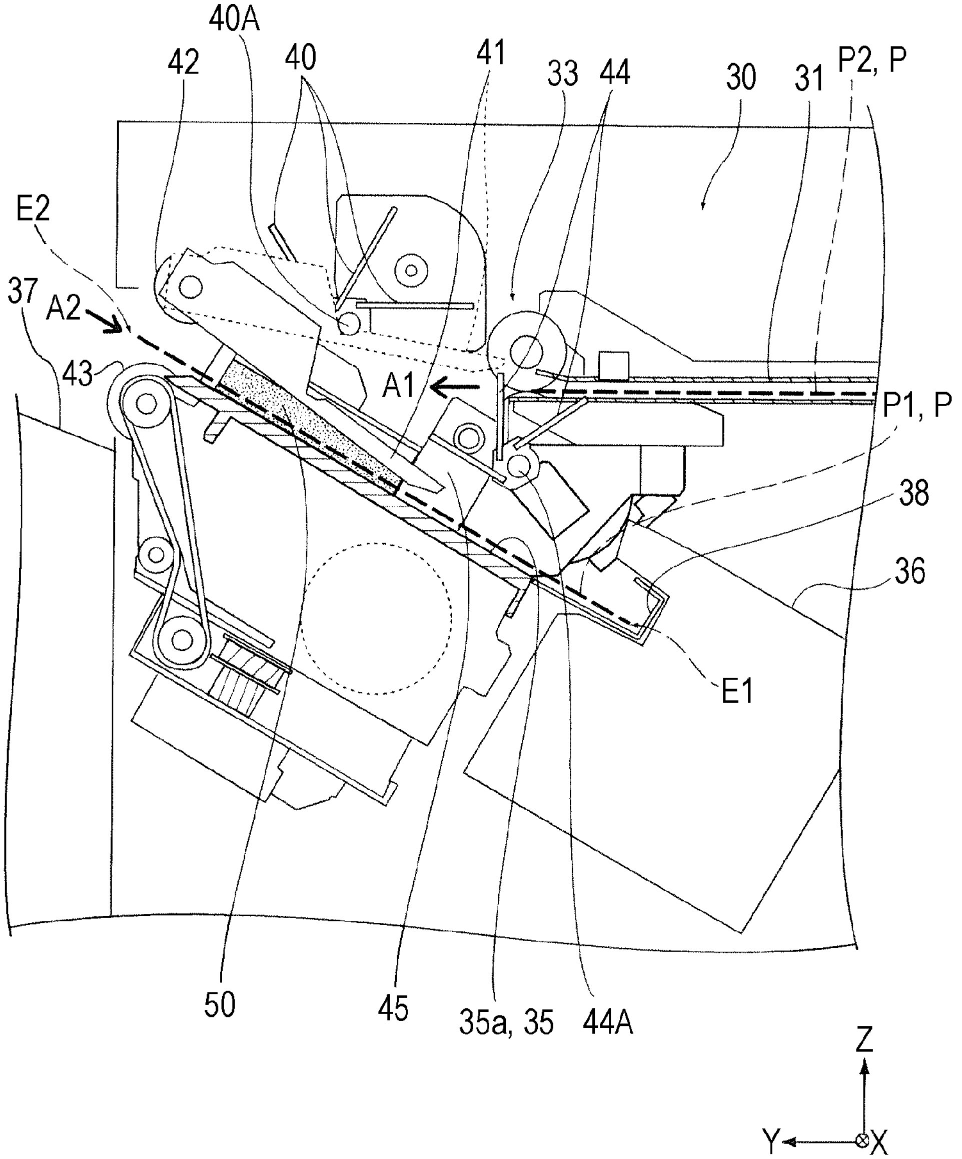
FIG. 3 is a cross-sectional view schematically illustrating the processing unit according to the embodiment of the present disclosure.
Figure 4:
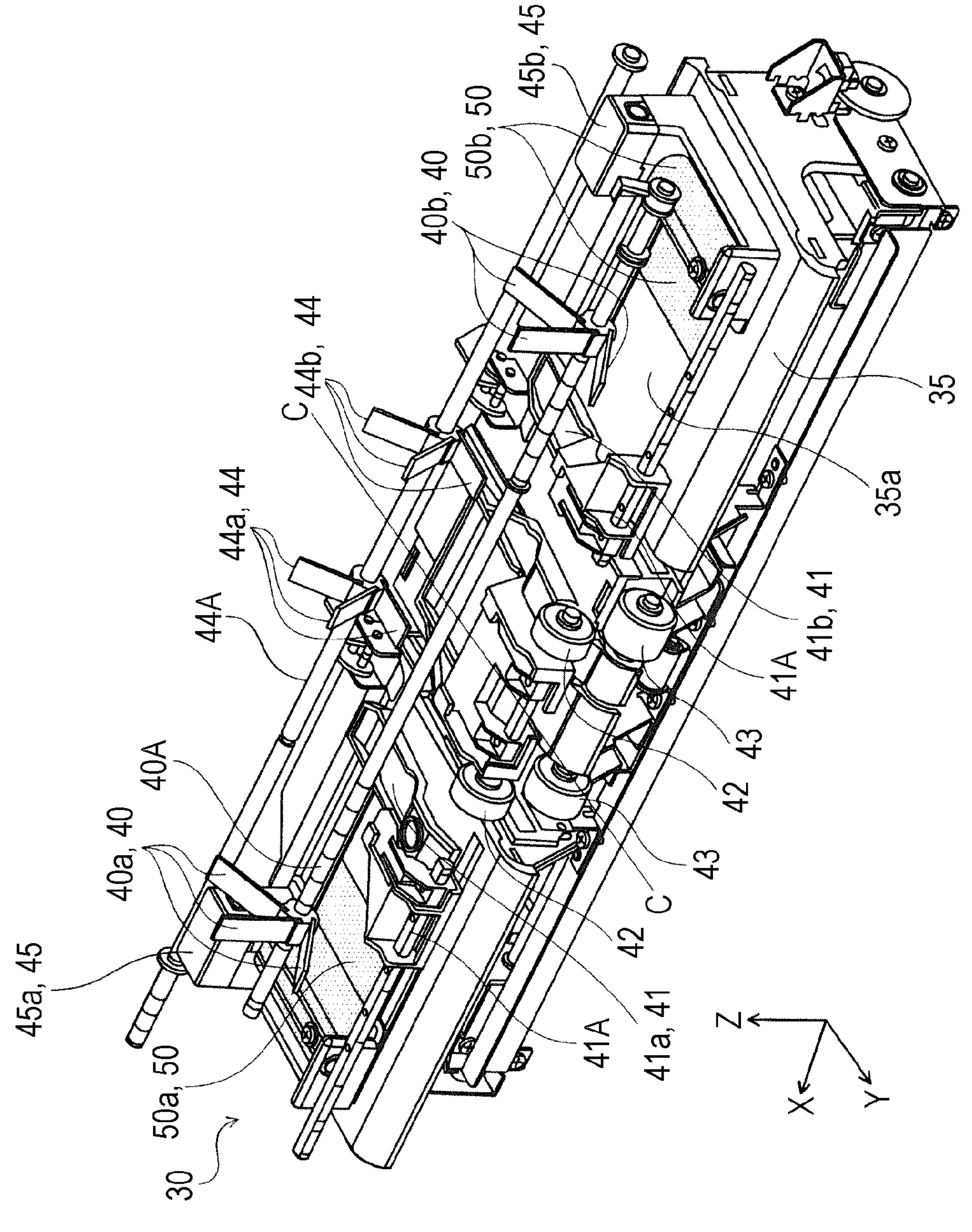
FIG. 4 is a perspective view of the processing unit according to the embodiment of the present disclosure.

The upstream paddles 40 and the guide members 41 overlap with each other in a direction in which the medium P is discharged as illustrated in FIGS. 2 and 3, and are shifted from each other as illustrated in FIG. 4 in the X-axis direction that is the width direction intersecting with the discharge direction A1 and the transport direction A2. In FIG. 4, one of the upstream paddles 40 and one of the guide members 41 are arranged on one side and the other of the upstream paddles 40 and the other of the guide members 41 are arranged on the other side in a symmetrical manner with respect to a center C in the width direction. That is, a paddle 40*a* and a guide member 41*a* are disposed on a +X side with respect to the center C and a paddle 40*b* and a guide member 41*b* are disposed on a −X side. The upstream paddles 40 has a plate-like body, and a plurality of such plate-like bodies are attached along an outer circumference of a rotation shaft 40A at a certain interval. Each of the guide members 41 has a +Y end that is in a downstream in the discharge direction and that is attached to a rocking axis 41A and a −Y end that is a free end that may be rocked.

Upper rollers 42 are disposed on an upper portion in a downstream in the discharge direction of the medium P with respect to the upstream paddles 40 and the guide members 41. The upper rollers 42 nip at least one of the media P stacked on the stacking section 35 with lower rollers 43 disposed near the stacking section 35 so as to discharge the medium P to a tray 37. As illustrated in FIGS. 2 and 3, the tray 37 that receives the medium P discharged from the stacking section 35 is disposed on a +Y direction side of the stacking section 35.

The medium P discharged by the discharge roller pair 33 is stacked on the stacking section 35. Note that, although the discharge roller pair 33 serving as a discharge section is disposed in the processing unit 4 serving as the post-processing apparatus in this embodiment, the discharge section may be disposed in the recording unit 2 or the intermediate unit 3. A position of the tip end E1 of the medium P discharged to the stacking section 35 is aligned when the tip end E1 is in contact with the tip end alignment section 38. When the plurality of media P are stacked on the stacking section 35, tip ends E1 of the plurality of media P are aligned by the tip end alignment section 38.

Furthermore, the medium transport apparatus 30 includes a side edge alignment section 45 that aligns side edges E2, that is, edge portions of the medium P in the width direction. The side edge alignment section 45 has a first alignment section 45*a* disposed in a +X direction, that is, a first direction, in the width direction on the stacking section 35 and a second alignment section 45*b* disposed in a −X direction, that is, a second direction, opposite to the first direction on the stacking section 35 as illustrated in FIG. 4. When the controller 60 controls a side edge alignment section movement mechanism, not illustrated, the side edge alignment section 45 aligns the side edges E2 of the medium P by bringing the first alignment section 45*a* and the second alignment section 45*b* close to each other so as to be in contact with the side edges E2 of the medium P after the medium P is stacked on a portion between the first alignment section 45*a* and the second alignment section 45*b*.

Figure 5:
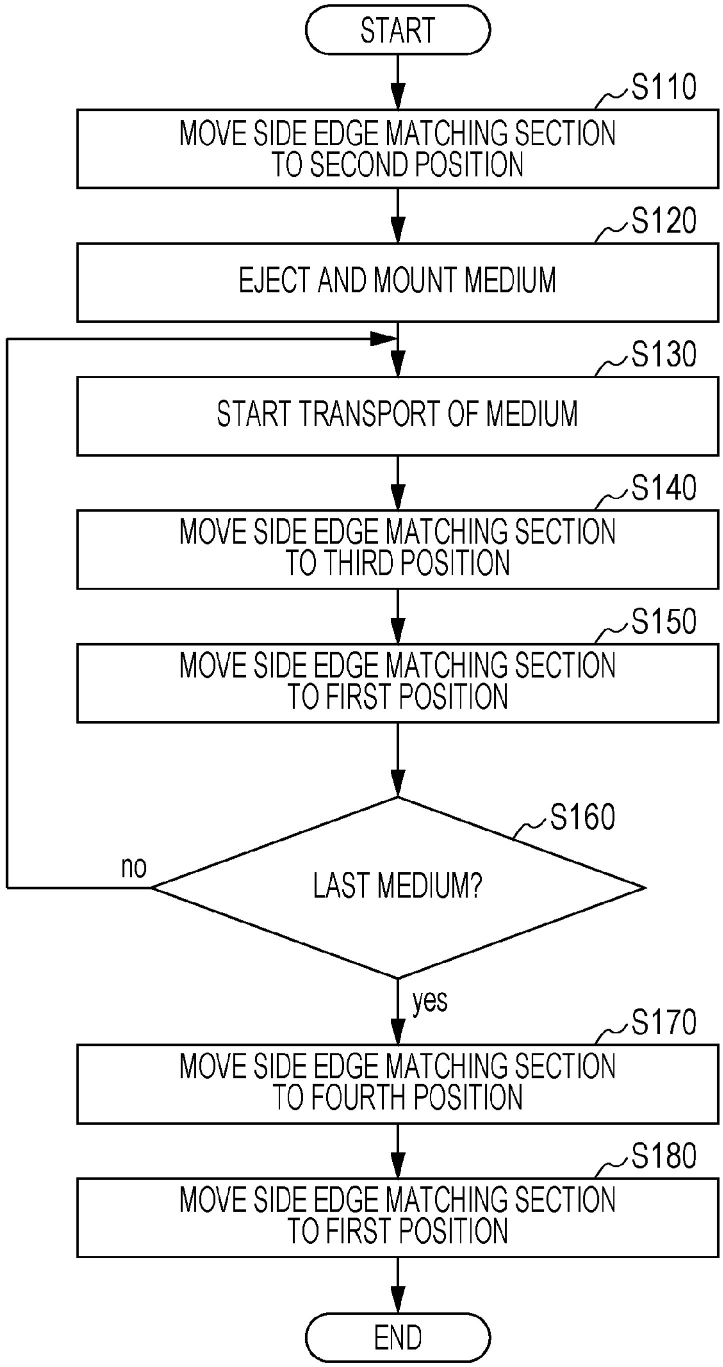
FIG. 5 is a flowchart of an example of a skew suppressing operation performed by the processing unit according to the embodiment of the present disclosure.
Figure 7:
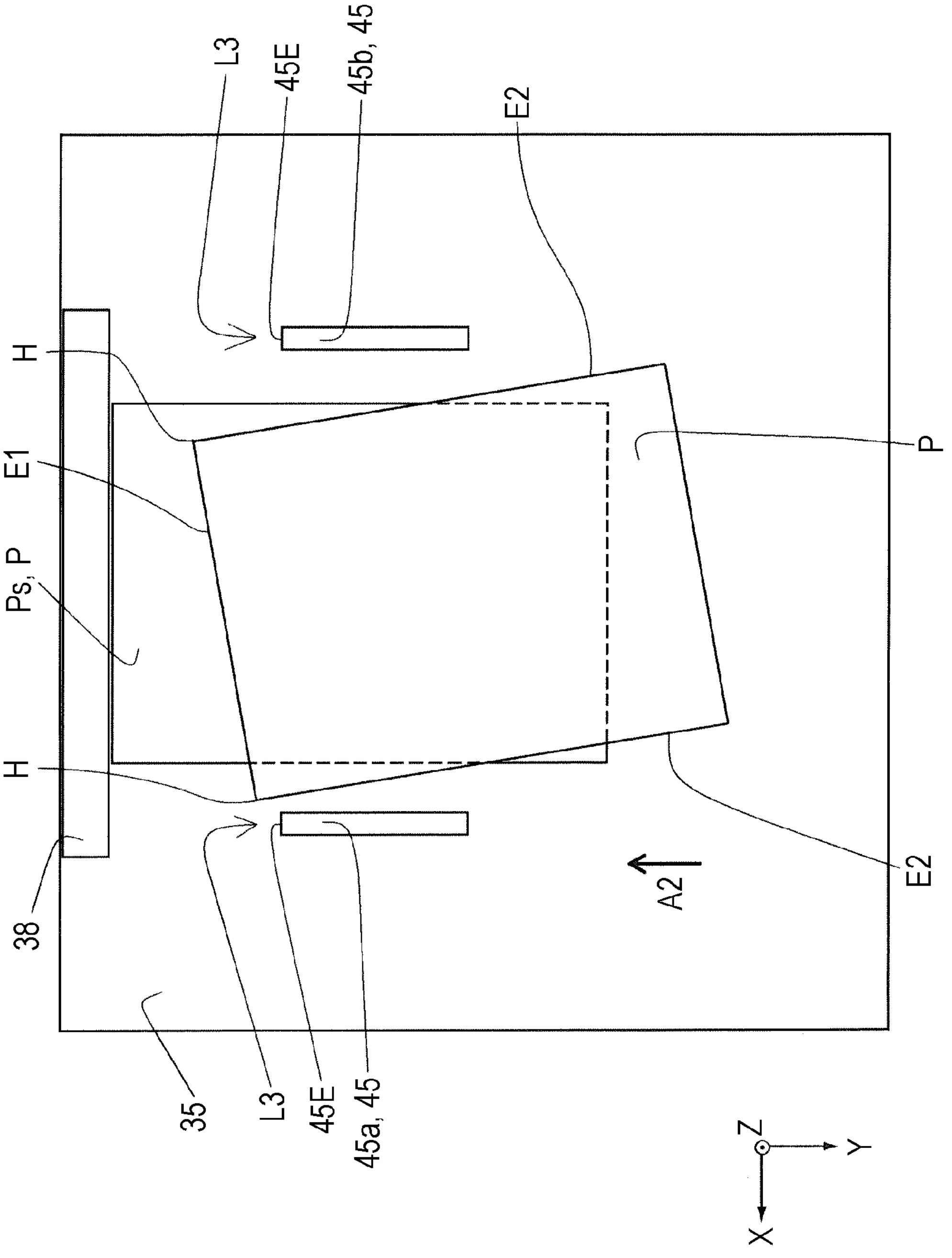
FIG. 7 is a diagram schematically illustrating a state in which the side edge alignment section is in a third position in the processing unit according to the embodiment of the present disclosure.
Figure 8:
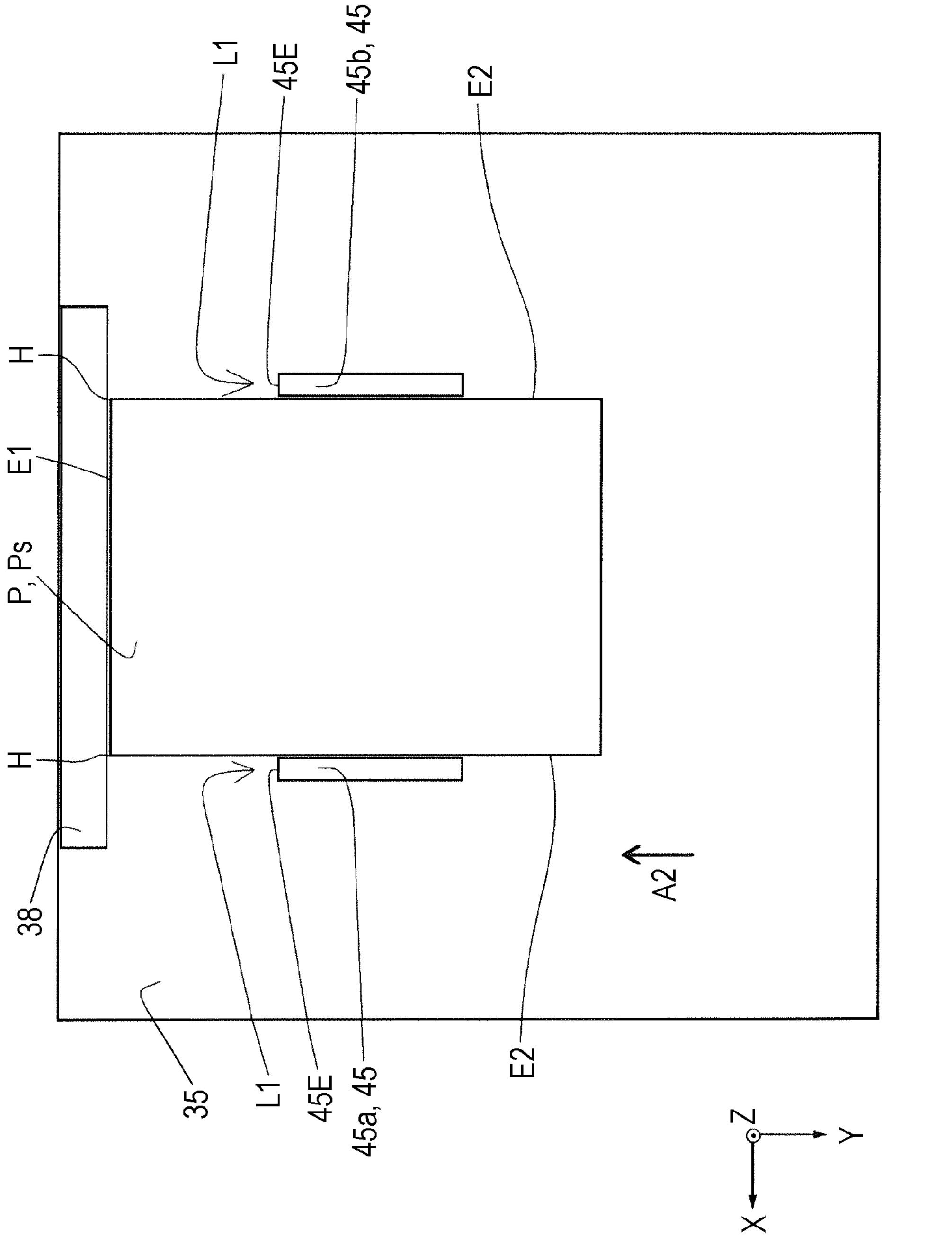
FIG. 8 is a diagram schematically illustrating a state in which the side edge alignment section is in a first position in the processing unit according to the embodiment of the present disclosure.
Figure 9:
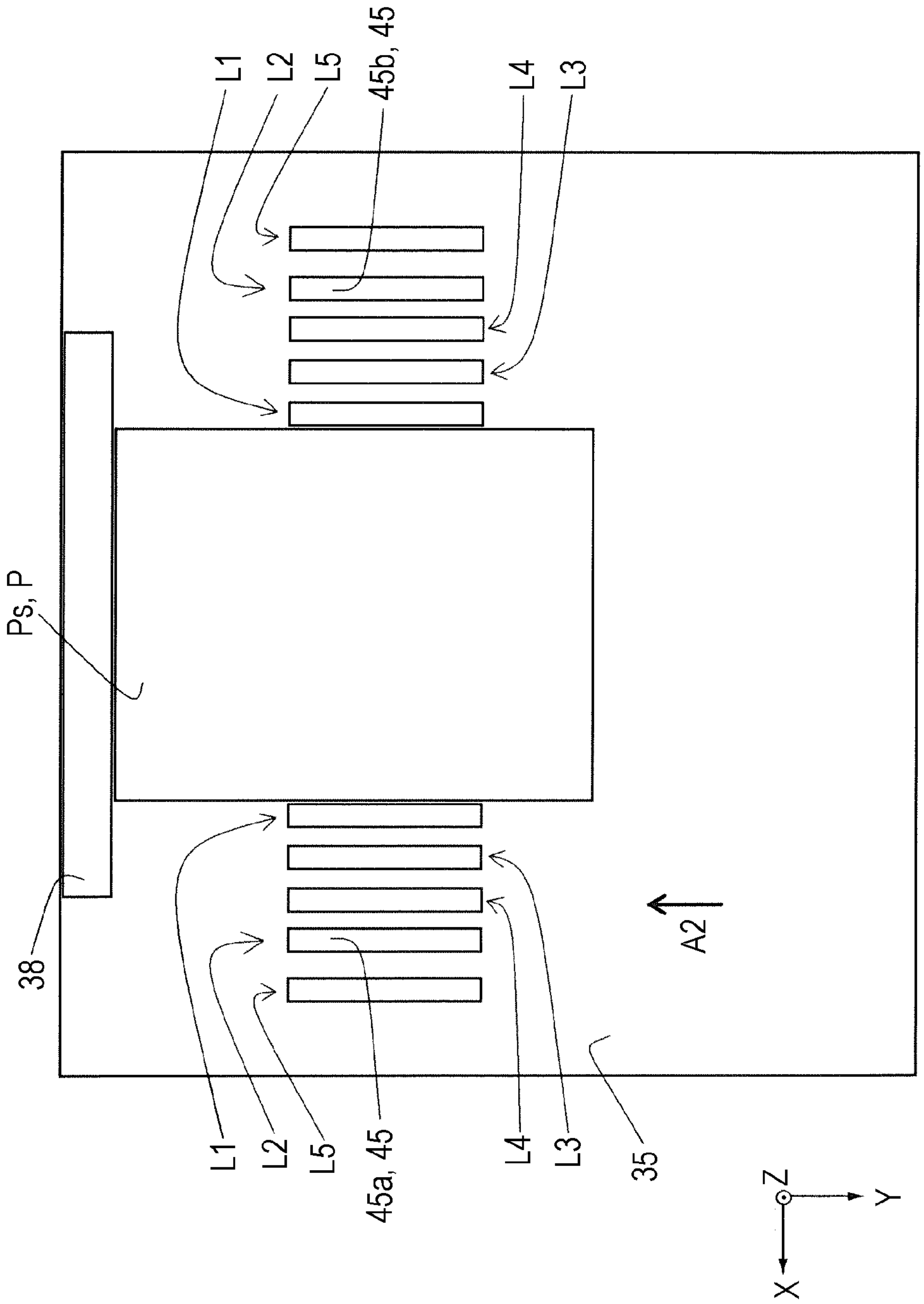
FIG. 9 is a diagram schematically illustrating the positional relationship among the first position, the second position, the third position, a fourth position, and a fifth position of the side edge alignment section of the processing unit according to the embodiment of the present disclosure.

Next, an adjustment operation in the width direction of the medium P performed by the side edge alignment section 45 will be described using a flowchart of FIG. 5 with reference to FIGS. 6 to 10. Hereinafter, the adjustment operation in the width direction of the medium P performed by the side edge alignment section 45 and the alignment operation of aligning the medium P described above will be described as a skew suppressing operation. When the skew suppressing operation is started, first, in step S110, the side edge alignment section 45 is moved from the fifth position L5 that is a standby position of the side edge alignment section 45 at a time of power off to the second position L2, for example. Note that, although the positional relationship between the second position L2 and the fifth position L5 is illustrated in FIG. 9, the arrangement of the fifth position L5 relative to the second position L2 is not limited to such a position outside the second position L2.

When the side edge alignment section 45 moves to the second position L2, the medium P is discharged from the discharge roller pair 33 and is stacked on the stacking section 35 in step S120. Subsequently, in step S130, the upstream paddles 40 start transport of the medium P in the transport direction A2. Note that, in the processing unit 4 of this embodiment, the downstream paddles 44 are disposed in a downstream in the transport direction A2 relative to the upstream paddles 40 as illustrated in FIG. 4 and the like. When the medium P is transported in the transport direction A2, the downstream paddles 44 may be used in addition to the upstream paddles 40. As illustrated in FIG. 4, one of the downstream paddles 44 is arranged on one side and the other of the upstream paddles 40 is arranged on the other side in a symmetrical manner with respect to the center C. That is, a paddle 44*a* is disposed on the +X side with respect to the center C and a paddle 44*b* is disposed on the −X side. The downstream paddles 44 have a plate-like body similarly to the upstream paddles 40, and a plurality of such plate-like bodies are attached along an outer circumference of a rotation shaft 44A with a certain interval.

Figure 6:
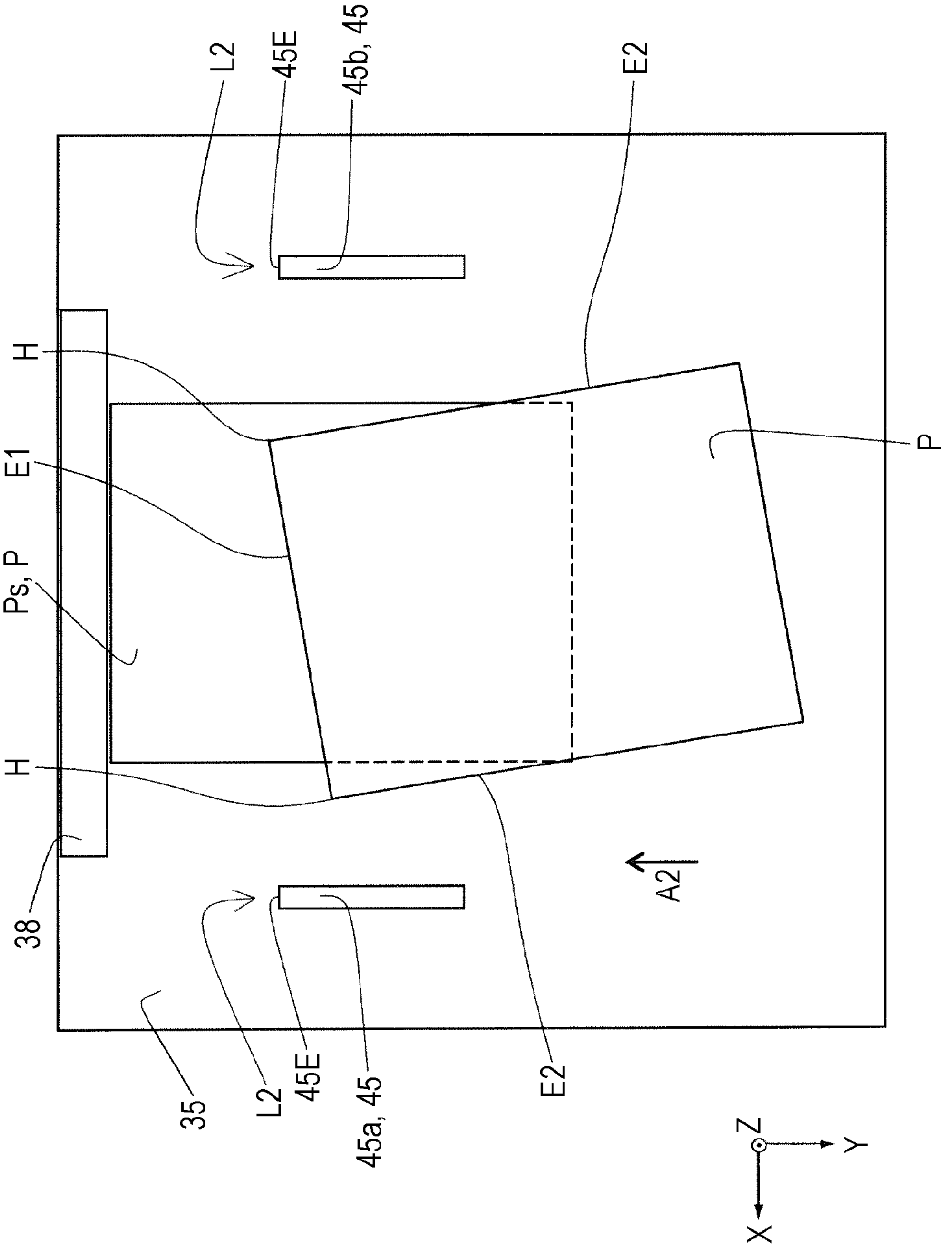
FIG. 6 is a diagram schematically illustrating a state in which a side edge alignment section is in a second position in the processing unit according to the embodiment of the present disclosure.

Here, FIG. 6 is a diagram illustrating a state immediately after transport of the medium P is started in the transport direction A2 and the side edge alignment section 45 is located in the second position L2. In this state, when the medium P is further transported and the entire tip end E1 in the downstream of the medium P in the transport direction A2, that is, both two corners H of the tip end E1 pass downstream edge sections 45E of the side edge alignment section 45 in the transport direction A2, the side edge alignment section 45 is moved from the second position L2 to the third position L3 in step S140. Here, FIG. 7 is a diagram illustrating a state in which the side edge alignment section 45 is located in the third position L3. Specifically, the operation in step S140 corresponds to an adjustment operation for reducing skew of the medium P by moving the side edge alignment section 45 from the second position L2 to the third position L3 while the upstream paddles 40 transport the medium P.

Thereafter, when the medium P is further transported so that the tip end E1 reaches the tip end alignment section 38, the side edge alignment section 45 is moved from the third position L3 to the first position L1 in step S150. Here, FIG. 8 is a diagram illustrating a state in which the side edge alignment section 45 is located in the first position L1. When the process in step S150 is terminated, the medium P in which transport thereof is started in step S130 is adjusted in an appropriate position. Specifically, the process in step S150 corresponds to the alignment operation for aligning the medium P. In step S150, the alignment operation is executed after the adjustment operation is performed in step S140 and after the tip end E1 has reached the tip end alignment section 38. In the alignment operation here, the side edge alignment section 45 abuts on the medium P in the first position L1 so that the medium P is aligned. In the alignment operation, the side edge alignment section 45 is moved to the first position L1 at least after the adjustment operation is performed. Therefore, in the alignment operation, the side edge alignment section 45 may be moved from the third position L3 to the first position L1 before the tip end E1 of the medium P reaches the tip end alignment section 38.

Subsequently, in step S160, the controller 60 determines whether the medium P being transported is the last medium P. When the controller 60 determines that a next medium P exists, that is, the medium P is not the last medium P, the process returns to step S130 and the process from step S130 to step S160 is repeatedly performed until the controller 60 determines that the medium P is the last medium. When the controller 60 determines that the medium P being transported is the last medium P in step S160, the process proceeds to step S170.

In step S170, the side edge alignment section 45 is moved from the first position L1 to the fourth position L4. In step S180, the side edge alignment section 45 is moved from the fourth position L4 to the first position L1. Specifically, the process in step S170 and step S180 corresponds to a re-alignment operation for moving the side edge alignment section 45 to the first position L1 again. When the process in step S180 is terminated, the skew suppressing operation of this embodiment is terminated.

As a summary, the processing unit 4 of this embodiment is a post-processing apparatus for performing post-processing on the medium P recorded by ejected liquid. Then the processing unit 4 of this embodiment includes the stacking section 35 on which the medium P to be subjected to the post-processing is stacked and the upstream paddles 40 that is brought into contact with the medium P and applies transport force to the medium P so as to transport the medium P in the transport direction A2. Furthermore, the processing unit 4 of this embodiment includes the tip end alignment section 38 that aligns the tip end E1 in the downstream of the medium P stacked on the stacking section 35 in the transport direction A2, the side edge alignment section 45 that is movable in the X axis direction that is the width direction orthogonal to the transport direction A2 of the medium P and that aligns the medium P in the width direction by abutting on the side edges E2 of the medium P from opposite sides in the width direction, and the controller 60 that controls the position of the side edge alignment section 45 in the width direction.

Here, the side edge alignment section 45 is movable to the first position L1 so as to abut on the side edges E2 from the opposite sides in the width direction, the second position L2 that is farther than the first position L1 from the side edges E2 in the width direction and that is used when the medium P is stacked on the stacking section 35, and the third position L3 located between the first and second positions L1 and L2 in the width direction. Note that the side edge alignment section 45 may be in contact with the medium P in the third position L3 when the medium P is transported by the upstream paddles 40 in a considerably skewed manner. Furthermore, the controller 60 may execute the adjustment operation of moving the side edge alignment section 45 from the second position L2 to the third position L3 while the upstream paddles 40 transport the medium P in step S140 and the alignment operation after the adjustment operation is performed and after the tip end E1 has reached the tip end alignment section 38 in step S150.

As described above, the processing unit 4 of this embodiment executes, after the tip end E1 of the medium P reaches the tip end alignment section 38, in addition to the alignment operation, the adjustment operation of moving the side edge alignment section 45 from the second position L2 to the third position L3 while the medium P is transported before the alignment operation. Specifically, the processing unit 4 executes the process of suppressing skew of the medium P in a step-by-step manner. In this way, since the operation of suppressing skew of the medium P is executed in a step-by-step manner, it is less likely that the corners H of the medium P transported in a skewed manner are damaged due to contact between the corners H and the side edge alignment section 45 and that the medium P is not appropriately aligned since the corners H slip into a lower side of the stacked media Ps. Accordingly, the processing unit 4 of this embodiment may effectively suppress the skew of the medium P. Note that, in this embodiment, the stacked media Ps indicate media P stacked after being subjected to the alignment operation and is regarded as media P in a standby state before being subjected to the post-processing.

Note that, specifically, the expression "the side edge alignment section 45 may be in contact with the medium P when the medium P is transported in a skewed manner" at least includes contact when the medium P skews by an assumable largest skew amount, and contact of a medium P that is not skewed or a medium P having a small skew amount is not required. For example, although the side edge alignment section 45 is not in contact with the medium P since a skew amount is small in the state of FIG. 7, when the medium P is transported with a large amount of skew, the side edge alignment section 45 is in contact with the medium P. Furthermore, the expression "the side edge alignment section 45 is moved to the first position L1 after the tip end E1 has reached the tip end alignment section 38" includes, in addition to a case where an operation of moving the side edge alignment section 45 to the first position L1 is started after the tip end E1 reaches the tip end alignment section 38, a case where the tip end E1 has reached the tip end alignment section 38 when the operation of moving the side edge alignment section 45 to the first position L1 that is started before the tip end E1 reaches the tip end alignment section 38 is terminated.

Note that, as illustrated in FIGS. 6 to 10, the side edge alignment section 45 extends in the transport direction A2. Then the controller 60 executes the adjustment operation after the tip end E1 passes the downstream edge sections 45E of the side edge alignment section 45 in the transport direction A2 in the entire width direction. In this way, since the side edge alignment section 45 extends in the transport direction A2, the processing unit 4 of this embodiment may effectively execute the skew suppressing operation for a long distance. Furthermore, since the processing unit 4 of this embodiment executes the adjustment operation after the tip end E1 of the medium P passes, in the entire width direction, the downstream edge sections 45E of the side edge alignment section 45 in the transport direction A2, that is, the processing unit 4 executes the adjustment operation after the corners H in the tip end E1 of the medium P pass the side edge alignment section 45, impact of the corners H in the tip end E1 of the medium P on the side edge alignment section 45 may be suppressed, and therefore, damage of the corners H may be suppressed.

Furthermore, as described above, the side edge alignment section 45 is movable to the fourth position L4 located between the second and third positions L2 and L3 in the width direction. The controller 60 performs the re-alignment operation by moving the side edge alignment section 45 to the fourth position L4 in step S170 after the alignment operation in step S150 and moving the side edge alignment section 45 to the first position L1 in step S180. Since the alignment operation is performed again in step S180 after the alignment operation is executed in step S150, skew of the medium P in the post-processing apparatus may be effectively suppressed. Furthermore, as illustrated in FIG. 9, the fourth position L4 is located farther from the side edge E2 of the medium P than the third position L3. Specifically, a movement amount of the side edge alignment section 45 in the width direction is larger than that when the alignment operation performed before the re-alignment operation is performed. In this way, since the movement amount of the side edge alignment section 45 is large, deformation of the medium P due to pressure of the side edge alignment section 45 may be released. Since the side edge alignment section 45 executes the re-alignment operation, the undeformed medium P may be aligned and alignment accuracy may be improved. The operation described above may attain separation of a function of suppressing the skew of the medium P and suppressing advancing of the skew of the medium P in the alignment operation performed for the first time from a function of reliably aligning the medium P in the alignment operation performed for the second time.

As described above, the processing unit 4 of this embodiment includes the downstream paddles 44 that are disposed in the downstream of the upstream paddles 40 in the transport direction A2, that apply transport force to the medium P by being into contact with the medium P, and that serve as a second transport section that transports the medium P in the transport direction A2. Then the controller 60 executes the adjustment operation before the medium P is brought into contact with the downstream paddles 44. When the adjustment operation is executed in a state in which the medium P is in contact with the downstream paddles 44, the adjustment operation may not be appropriately performed due to friction force between the medium P and the downstream paddles 44 or the like. However, the processing unit 4 of this embodiment may reduce such possibility. Note that, although the second transport section in the processing unit 4 of this embodiment is the paddles having the plurality of plate-like bodies attached along the outer circumference of the rotation shaft with an interval, the configuration is not limited to this and the second transfer section may be rollers, for example.

In other words, the downstream paddles 44 of this embodiment have the plurality of plate-like bodies attached along the outer circumference of the rotation shaft with the certain interval. Therefore, when the downstream paddles 44 rotate along the rotation shaft, postures of the plate-like bodies of the downstream paddles 44 relative to the medium P are changed. The change in the postures causes change in positions where the plate-like bodies are in contact with the medium P and separation positions where the plate-like bodies are separated from the medium P. In other words, the downstream paddles 44 may be moved between separation positions for separation from the medium P and contact positions for contact with the medium P. Here, the controller 60 executes the adjustment operation when the downstream paddles 44 are in the separation positions. In this way, the processing unit 4 of this embodiment executes the adjustment operation when the downstream paddles 44 are in the separation positions. When the adjustment operation is executed in a state in which the medium P is in contact with the downstream paddles 44, the adjustment operation may not be appropriately performed due to friction force between the medium P and the downstream paddles 44 or the like. However, the processing unit 4 of this embodiment may reduce such possibility. Furthermore, as for the change between the separation positions and the contact positions of the downstream paddles 44, the separation positions and the contact positions may be switched from one to another when the downstream paddles 44 move in a vertical direction. Note that, when the second transport section is rollers, for example, positions of the rollers facing the medium P may be changed between contact positions where the rollers are in contact with the medium P and separation positions where the rollers are separated from the medium P.

Furthermore, as with the downstream paddles 44, in the processing unit 4 of this embodiment, positions of the upstream paddles 40, serving as the first transport section, facing the medium P may be changed between contact positions where the upstream paddles 40 are in contact with the medium P and separation positions where the upstream paddles 40 are separated from the medium P. Then the controller 60 executes the adjustment operation when the upstream paddles 40 are in the separation positions. When the adjustment operation is executed in a state in which the medium P is in contact with the upstream paddles 40, the adjustment operation may not be appropriately performed due to friction force between the medium P and the upstream paddles 40 or the like. However, the processing unit 4 of this embodiment may reduce such possibility. Furthermore, as for the change between the separation positions and the contact positions of the upstream paddles 40, the separation positions and the contact positions may be switched from one to another when the upstream paddles 40 move in a vertical direction.

Furthermore, as with the downstream paddles 44, although the upstream paddles 40 serving as the first transport section in the processing unit 4 of this embodiment are attached along an outer circumference of an rotation shaft with an interval, the configuration is not limited to this and the first transfer section may be rollers, for example. Furthermore, when the first transport section is rollers, for example, positions of the rollers facing the medium P may be changed between contact positions where the rollers are in contact with the medium P and separation positions where the rollers are separated from the medium P.

Furthermore, the controller 60 is electrically coupled to the controller 15 of the recording unit 2 and serves as an estimation section that estimates an amount of skew of the medium P using recorded data input to the controller 15. Then, when the skew amount estimated by the controller 60 is equal to or smaller than a first threshold value, the controller 60 may execute the alignment operation in step S150 without executing the adjustment operation in step S140. When the skew amount is small, the alignment operation may be effectively performed without executing the adjustment operation, and therefore, the processing unit 4 of this embodiment may simplify control performed when the alignment operation is effectively performed but the adjustment operation is not executed. Note that, although the controller 60 also serves as the estimation section in this embodiment, the configuration is not limited to this and an estimation section may be provided separately from the controller 60. Furthermore, a camera capable of reading ink ejected to the medium P may be provided to estimate a skew amount using image data obtained by the camera.

Figure 10:
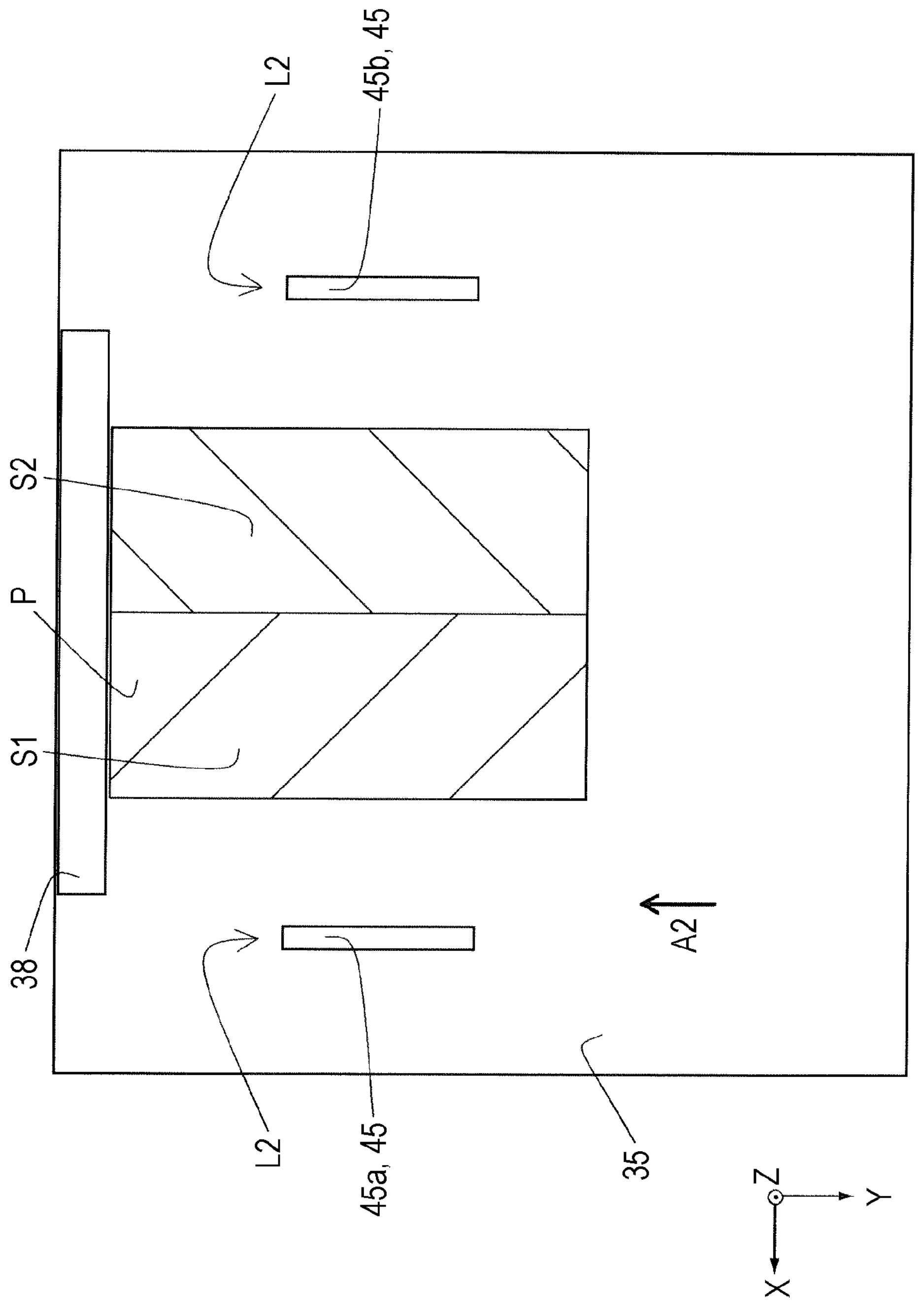
FIG. 10 is a diagram schematically illustrating a first region and a second region of a medium.

The controller 60 may estimate a skew amount of the medium P using an ejection rate of ink, that is, liquid, per unit area of the medium P. Then, assuming that, as illustrated in FIG. 10, one of regions divided at a center in the width direction of the medium P is determined as a first region S1, the other region is determined as a second region S2, an ejection rate in the first region S1 is determined as a first ejection rate, and an ejection rate in the second region S2 is determined as a second ejection rate, the controller 60 may perform control such that the adjustment operation is executed when a difference rate that is a difference between the first ejection rate and the second ejection rate is equal to or larger than a second threshold value. As the difference rate becomes large, a difference between a friction coefficient of the medium P and the upstream paddles 40 in the first region S1 and a friction coefficient of the medium P and the upstream paddles 40 in the second region S2 becomes large, and therefore, skew is likely to occur. However, since the adjustment operation is executed in such a case, the skew of the medium P in the post-processing apparatus may be effectively suppressed. The ejection rate here may be an ejection rate on a front surface of the medium P or an ejection rate on a back surface of the medium P. Furthermore, examples of the ejection rate include a rate of the number of dots of ink actually ejected to a largest number of dots of ink possibly ejected.

Furthermore, as illustrated in FIG. 6, the controller 60 may execute the alignment operation after executing the adjustment operation when the stacked media Ps exist under the medium P being transported by the upstream paddles 40, and execute the alignment operation without executing the adjustment operation when the stacked media Ps do not exist under the medium P being transported by the upstream paddles 40. When the stacked media Ps exist, it is likely that skew occurs when compared with a case where the stacked media Ps do not exist. This is particularly significant when an ink jet printer is employed. When an ink jet printer is employed, a friction coefficient on a surface is increased since a medium absorbs ink. Therefore, friction between the medium P and the stacked media Ps varies according to print patterns of the medium P and an uppermost medium Psi in the stacked media Ps, and therefore, a load at a time of transport varies. When the transport load is changed in the width direction, the medium P is likely to skew at the time of transport. Therefore, the skew of the medium P may be effectively suppressed by executing the adjustment operation when the stacked media Ps exist.

Furthermore, the controller 60 realizes a lower movement speed of the side edge alignment section 45 at the time of the alignment operation than a movement speed of the side edge alignment section 45 at the time of the adjustment operation. Specifically, the adjustment operation that requires lower accuracy is executed at high speed, and therefore, reduction of a transport speed of the medium P is not required and degradation of throughput is suppressed, whereas the alignment operation that requires high accuracy is reliably executed at low speed, and therefore, the skew of the medium P is effectively suppressed. However, the control is not limited to this.

Note that, as illustrated in FIG. 4, the processing unit 4 of this embodiment includes low friction members 50 in positions in contact with a lower surface of the medium P in a transport region of the medium P transported by the upstream paddles 40. Therefore, in the processing unit 4 of this embodiment, the medium P is easily moved in the transport region of the medium P, and accordingly, the transport direction of the medium P may be effectively corrected and the skew of the medium P may be effectively suppressed. In the processing unit 4 of this embodiment, the low friction members 50 are disposed in opposite end portions in the width direction and includes a low friction member 50*a* on the +X side and a low friction member 50*b* on the −X side. However, the configuration is not limited to this.

Furthermore, although the line head 10 is used as a recording section in this embodiment, a head of a serial type may be used. Moreover, as the recording unit 2, instead of an ink jet printer that performs recording by ejecting ink, a laser printer that performs recording by fusing toner may be used. When the laser printer is used as the recording unit 2, the recording section corresponds to a portion associated with printing, such as a photoconductive drum.

Furthermore, the present disclosure is not limited to the embodiment above, and various modifications may be made within the scope of the present disclosure described in claims and are also included in the scope of the present disclosure.

What is claimed is:

1. A post-processing apparatus that performs post-processing on a medium recorded by a recording section, the post-processing apparatus comprising:

a stacking section that stacks the medium to be subjected to the post-processing;

a first transport section that is brought into contact with the medium and applies transport force to the medium so as to transport the medium in a transport direction;

a tip end alignment section that aligns a tip end of the medium in a downstream of the transport direction, the medium being stacked on the stacking section;

a side edge alignment section that is configured to move in a width direction orthogonal to the transport direction of the medium and that aligns the medium by abutting on side edges of the medium from opposite sides in the width direction; and a controller that controls a position of the side edge alignment section, wherein the side edge alignment section is configured to move to a first position where the side edge alignment section abuts on the side edges from the opposite sides in the width direction, a second position, that is farther from the side edges in the width direction than the first position, where the medium is stacked on the stacking section, and a third position, that is between the first position and the second position in the width direction, where the side edge alignment section is in contact with the medium when the first transport section transports the medium in a skewed manner, the controller is configured to execute an adjustment operation of moving the side edge alignment section from the second position to the third position and an alignment operation of aligning the medium by causing the side edge alignment section to abut on the medium in the first position, and the adjustment operation is executed while the first transport section transports the medium and the alignment operation is executed after the adjustment operation is performed and after the medium reaches the tip end alignment section.

2. The post-processing apparatus according to claim 1, wherein the side edge alignment section extends in the transport direction, and the controller executes the adjustment operation after the tip end passes, in the entire width direction, side edges of the side edge alignment section in a downstream of the transport direction.

3. The post-processing apparatus according to claim 1, wherein the side edge alignment section is configured to move to a fourth position between the second position and the third position in the width direction, and the controller moves the side edge alignment section to the fourth position after the alignment operation so as to execute the alignment operation again.

4. The post-processing apparatus according to claim 1, further comprising:

a second transport section that is disposed in a downstream of the first transport section in the transport direction and that is brought into contact with the medium and applies transport force to the medium so as to transport the medium in the transport direction, wherein the controller executes the adjustment operation before the medium is brought into contact with the second transport section.

5. The post-processing apparatus according to claim 1, further comprising:

a second transport section that is disposed in a downstream of the first transport section in the transport direction and that is brought into contact with the medium and applies transport force to the medium so as to transport the medium in the transport direction, wherein the second transport section is located in a position facing the medium and is moved between a contact position where the second transport section is in contact with the medium and a separation position where the second transport section is separated from the medium, and the controller executes the adjustment operation when the second transport section is in the separation position.

6. The post-processing apparatus according to claim 1, wherein the first transport section is located in a position facing the medium and is moved between a contact position where the first transport section is in contact with the medium and a separation position where the first transport section is separated from the medium, and the controller executes the adjustment operation when the first transport section is in the separation position.

7. The post-processing apparatus according to claim 1, further comprising:

an estimation section that estimates an amount of skew of the medium, wherein when the amount of skew estimated by the estimation section is not larger than a first threshold value, the controller executes the alignment operation without executing the adjustment operation.

8. The post-processing apparatus according to claim 7, wherein the recording section performs recording on the medium by ejecting liquid, the estimation section estimates the amount of skew using an ejection rate of the liquid per unit area of the medium, one of regions divided by a center of the medium in the width direction is determined as a first region, the other of the regions is determined as a second region, the ejection rate in the first region is determined as a first ejection rate, and the ejection rate in the second region is determined as a second ejection rate, and the controller executes the adjustment operation when a difference rate that is a difference between the first ejection rate and the second ejection rate is not less than a second threshold value.

9. The post-processing apparatus according to claim 1, wherein the controller executes the alignment operation after executing the adjustment operation when a stacked medium exists under the medium being transported by the first transport section, and executes the alignment operation without executing the adjustment operation when the stacked medium does not exist under the medium being transported by the first transport section.

10. The post-processing apparatus according to claim 1, further comprising:

a low-friction member in such a position, in a transport region of the medium transported by the first transport section, that the low-friction member is in contact with a lower surface of the medium.

11. The post-processing apparatus according to claim 1, wherein the controller realizes a lower movement speed of the side edge alignment section at a time of the alignment operation than a movement speed of the side edge alignment section at the time of the adjustment operation.

* * * * *